United States Patent Office 3,809,595
Patented May 7, 1974

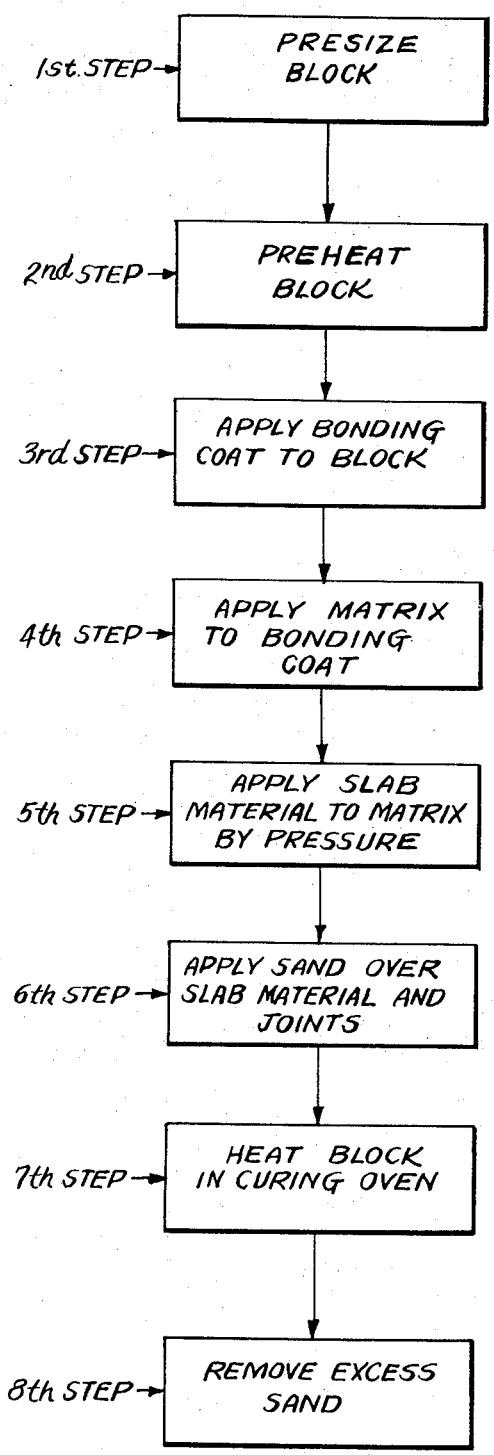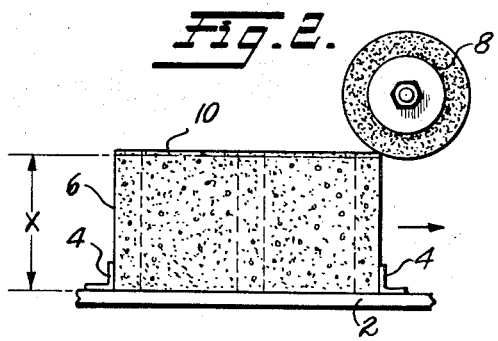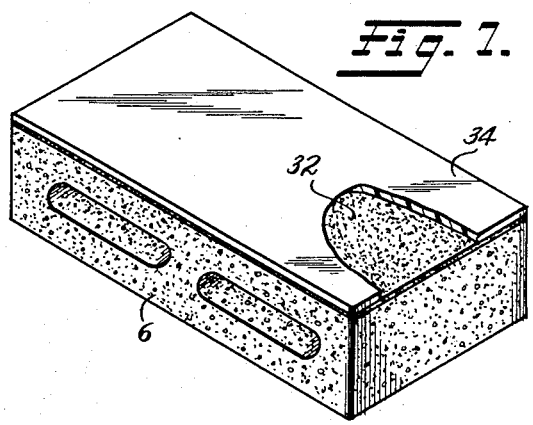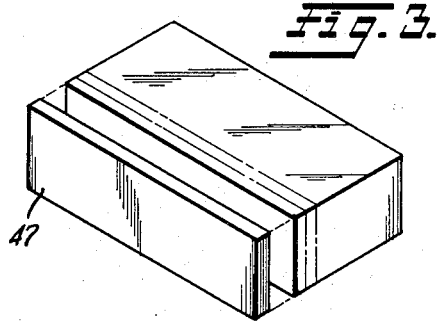

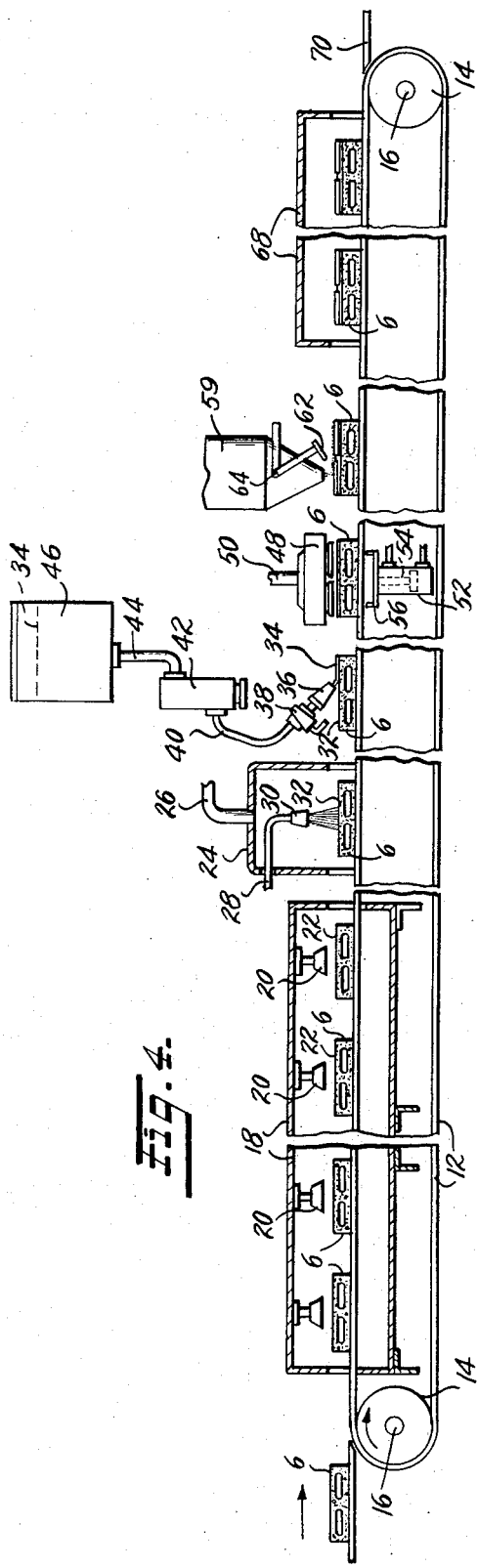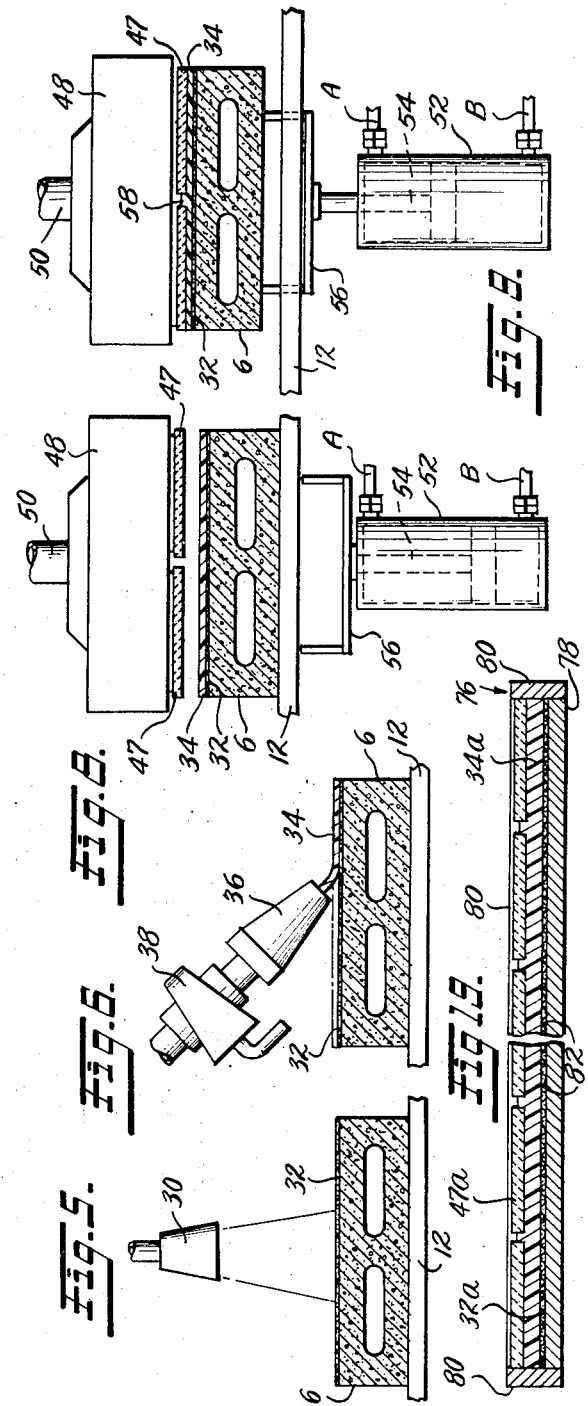

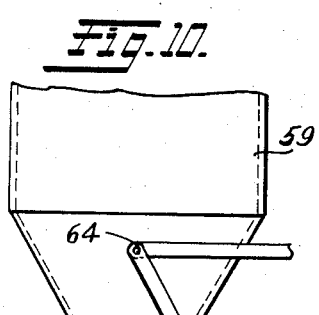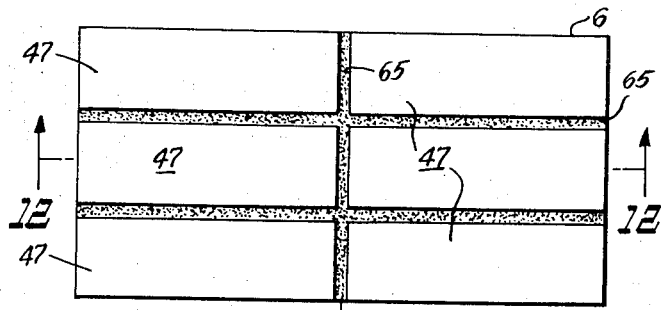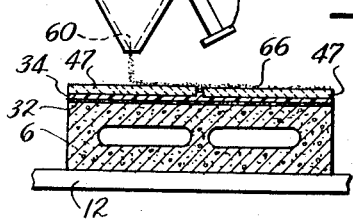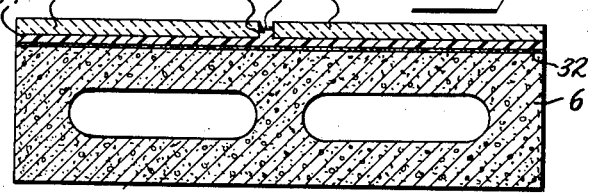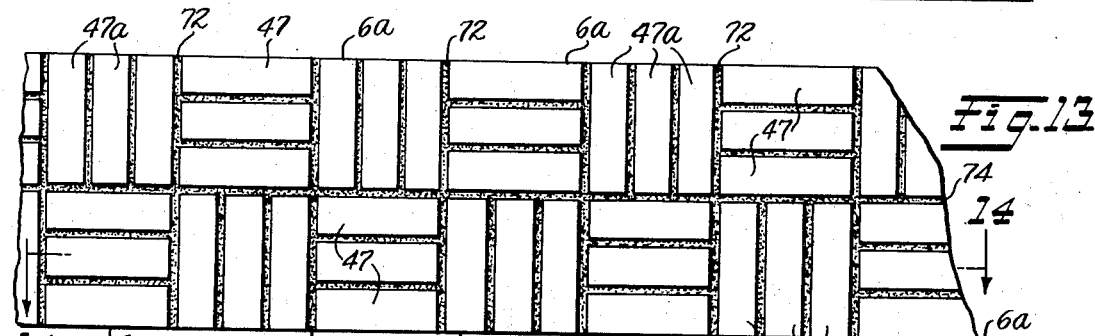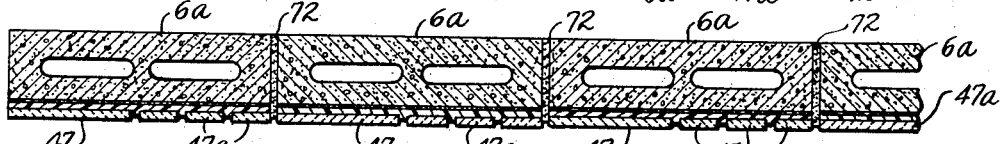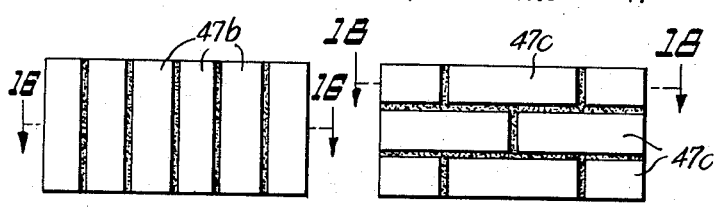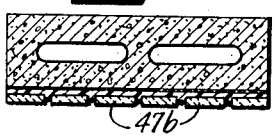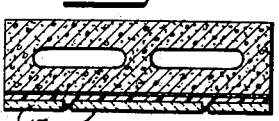

3,809,595
CONCRETE BLOCK OR THE LIKE WITH MULTIPLE BRICK FACING AND METHOD OF MAKING THE SAME
Charles E. Nichols, Jr., North Augusta, S.C., and Gerald T. Howard, Gracewood, Ga., assignors to Merry Companies Incorporated, Augusta, Ga.
Original application Apr. 21, 1969, Ser. No. 817,980, now Patent No. 3,660,214. Divided and this application Jan. 19, 1971, Ser. No. 107,662
Int. Cl. B44c 5/04; B44d 1/44
U.S. Cl. 156—267
16 Claims

ABSTRACT OF THE DISCLOSURE

A method and resulting structural building unit wherein a cement block, for example, has a portion removed, if necessary, to give it a predetermined vertical height. The presized block is placed upon a continuously moving conveyer and one side of the block is preheated and then coated with a liquid metal comprising a polyester resin, a styrene monomer, a solvent, and a catalyst. The stored heat in the block quickly evaporates the solvent and polymerizes the resin and monomer so that a strongly adhering bonding coat is formed on the block. A layer of matrix material of relatively thick consistency, comprising a polyester resin, a styrene monomer, finely divided silica, colloidal silica, and a catalyst is applied to the coated block. The layer of matrix may be ⅛″ thick or thicker, depending upon the type of building unit that is being made. Slabs of brick or other material are partially embedded in the matrix, in spaced relation, to form a facing for the block with simulated mortar joints. Sand is sprinkled on the facing material and the exposed matrix. The matrix is then cured or polymerized by passing the block through a curing oven. The matrix permanently bonds the facing material to the block, and renders the covered side of the block impervious to moisture. The sand adheres to the matrix, but is readily removable from the facing slabs.

CROSS-REFERENCE

This application is a division of our application Ser. No. 817,980, filed Apr. 21, 1969 which has matured into Pat. No. 3,660,214.

BACKGROUND OF THE INVENTION

(1) Field of the invention

The present invention relates to a concrete building block, wall panel, or the like having facing elements applied thereto to simulate a mortar-laid brick wall or to present any other desired appearance. The invention further relates to a method and materials for applying the facing elements to the building block.

(2) Description of the prior art

Heretofore, building blocks and the like intended to have a surface simultating a brick wall have been made by securing facing slabs of brick to a concrete block by using mortar (Dula, 1,411,005), or "by cementing" brick or tile to the concrete block (Willson, 1,844,828). Such blocks are subject to the objection that the slabs are not permanently adhered to the blocks and can be knocked off in handling, or fall off upon weathering of the mortar or cement. There is the further objection that the facing slabs and the material used to secure them to the blocks do little, if anything, to render the outer face of the block impervious to moisture.

SUMMARY OF THE INVENTION

The present invention avoids the objections noted above in that the facing material is not only permanently secured to the block, or other building unit, but the bonding material used for the purpose renders the entire outer face of the block or unit impervious to moisture penetration.

More specifically, the present invention relates to a concrete block or the like with facing material applied thereto simulating a mortar-laid construction, and to the method and polymerizable compositions used in making the same.

Conventional concrete and cinder building blocks are made in a mold which controls the width and length of the block, but not height, which varies depending upon the volume of the mix that is dumped into the mold. As a result, the vertical height of the block is frequently greater than desired. In applying facing material in accordance with the present invention, it is important that the vertical height of the block conform to a predetermined dimension. This is necessary so that the facing material can be applied thereto in uniform size and uniformly spaced apart a distance equal to the thickness of a conventional mortar joint, and so that the resulting blocks, when laid to form a brick wall, can be laid with the same conventional thickness of mortar joint therebetween. Consequently, the first step in the present process is to make certain that the block to be faced is of the desired vertical height. If the height of the block is in excess of that desired a portion of the upper side thereof is removed by a grinding wheel. The thus presized block is laid on its side and heat is applied to at least its upper surface to preheat the same to condition it for receiving and facilitating curing of a resinous bonding material. Such heating may take place in a preheat oven and be effected by radiant, gas, electrical, or any suitable form of heat. After the top surface of the block is heated to a temperature of about 225° F., it is coated with a mixture containing a polyester resin, a styrene monomer, a solvent, and a catalyst. After the solvent has been flashed off by the heat contained in the block, the bonding coat quickly polymerizes. A layer of matrix material of a thickness of about ⅛″ is applied to the bonding coat over the entire top surface of the block. The matrix comprises a polyester resin, styrene monomer, silica flour and colloidal silica ("Carbosil"), and a catalyst.

Facing material, which may be in the form of brick slabs, marble, or other material, is then partially embedded in the matrix. Brick or marble facings can readily be provided by slicing bricks or pieces of marble into slabs with a ceramic saw. The slabs can be of any suitable thickness; which may vary from less than ¼″ to 2″ or more. A slab ⅜″ thick is preferred for most applications. Alternatively, the slabs may be extruded or dry pressed, or extruded and wire cut, and then burned to provide slabs of the desired thickness rather than cut from whole brick with a ceramic saw. A group of slabs arranged in predetermined pattern is held stationary by a suction head. The matrix is of such body or consistency that when the block is raised by a cylinder, the matrix is pressed against the facing to partially embed the slabs in the matrix, so that the slabs are retained in place and will not "drift" relative to the block. While a polyester resin is the preferred method of applying the slabs to the block faces, such thermosetting resins as epoxy resins, epoxynovolacs, polyurethanes both of the polyester and polyester type can also be used to attach the slabs to the face of the block. Also, thermoplastic resins such as acrylonitrile-butadiene-styrene resins, polyamides, vinyl compounds, acrylics and other thermoplastics may be used to attach the brick slabs to the block faces using heat.

Fillers such as silica or calcium carbonate can be used with all systems.

After the facing has been applied to the matrix, the block is lowered, and carried by the conveyer to a position where the entire block is covered with a thin layer of sand. It is then passed through a curing oven, or allowed to cure at room temperature, to polymerize the matrix and fuse it with the bonding coat and adhere the facing to the block. The particles of sand in direct contact with the matrix will adhere thereto while the sand in contact with the facing will be unattached and readily removable. The adhered sand will present the appearance of a mortar joint between the slabs of facing material.

The sand application can be omitted, but it is preferred to include this step because the sand adheres permanently to the matrix and truly simulates a mortar joint, which is a valuable feature. When slabs of brick are used as a facing, the finished block simulates a portion of a brick wall having mortar joints. The step of preheating the block to cure the bonding coat, and the step of heating the matrix to cure it can be omitted, depending upon the amount of catalyst employed and upon whether slower curing at ambient temperature is acceptable.

The principal object of the invention is to provide a building block or wall panel having facing material attached thereto to simulate a brick wall or other structure, and to provide a simple and inexpensive method of making the same.

Another object is to provide a masonry building unit that is competitive in price with other building materials, such as wood and metal.

Still another object is to provide building units simulating brick structures and embodying patterns not readily attainable with conventional brick at low labor cost.

A further object is to provide a building unit simulating a brick structure that will speed up construction and reduce the amount of on-site labor.

Another object is to provide simulated brick building units which are resistant to heat and cold and are impervious to the penetration of moisture.

A still further object is to provide building units simulating brick structures that are easy to repair and to replace in the event of damage.

Another object is to provide a building unit of any desired size with simulated brick or other facing elements arranged in any desired pattern, including reproductions of modern or antique patterns.

Other objects and advantages will be apparent from the following description and accompanying drawings.

DESCRIPTION OF THE DRAWINGS

FIG. 1 is a diagram illustrating the successive steps to be used in carrying out one method of making a faced building block.

FIG. 2 diagrammatically illustrates the first step in the process, wherein the block is presized as to vertical height by grinding off excess material;

FIG. 3 shows a brick partially cut into slabs to provide facing elements for the block;

FIG. 4 is a diagrammatic view of apparatus that can be used in carrying out one method of making the faced block;

FIG. 5 schematically illustrates the step of spraying the liquid bonding material on the upper side of the block;

FIG. 6 diagrammatically shows a nozzle applying a layer of the matrix mix over the bonding material;

FIG. 7 illustrates the block after the bonding material and matrix mix have been applied to it;

FIG. 8 diagrammatically illustrates a suction head carrying brick slabs, the block with matrix applied, the conveyer, and cylinder for raising the block to press the matrix against the brick slabs;

FIG. 9 is a view similar to FIG. 8, but shows the block in its fully raised position;

FIG. 10 illustrates a hopper for dribbling sand over the top of the faced block;

FIG. 11 is a front elevational view of a block having one design arrangement of slab facings;

FIG. 12 is a horizontal sectional view, taken on the line 12—12 of FIG. 11;

FIG. 13 is an elevational view of a wall section constructed from blocks having another design of facing elements attached thereto;

FIG. 14 is a horizontal sectional view, taken on the line 14—14 of FIG. 13;

FIG. 15 is an elevational view of a third design of brick-faced block;

FIG. 16 is a horizontal sectional view, taken on the line 16—16 of FIG. 15;

FIG. 17 is an elevational view of a faced block showing a conventional arrangement of brick slabs;

FIG. 18 is a horizontal sectional view, taken on the line 18—18 of FIG. 17; and

FIG. 19 is a sectional view through another modification wherein facing elements are applied to a matrix backed by fiber glass cloth.

DESCRIPTION OF THE PREFERRED EMBODIMENTS

As is well known, in the machine-manufacture of conventional cement and cinder blocks, it is desired that a predetermined volume of the cement mix be dumped into each mold. However, it is extremely difficult to maintain the volume constant for each block, with the result that the blocks are of uniform length and width, but are not of uniform height. Therefore, for the purposes of the present invention, the 1st step is to presize the block. Thus, FIG. 2 illustrates a support 2 having angle irons 4, or any other suitable abutments, secured thereto for holding a conventional cement or cinder block 6 in a fixed position. A grinding wheel 8 is positioned a predetermined height above the support 2 so that as the support 2 is moved relative to the grinding wheel 8, or vice versa, the grinding wheel will quickly remove any excess material 10 above the prescribed vertical height of the block, which is indicated by the dimension X.

Referring to FIG. 4, the presized block 6 is turned over on its side and delivered to an endless conveyer 12 comprising pulleys or rolls 14 rotatably mounted upon shafts 16 at the opposite ends of the apparatus. The conveyor 12 is continuously driven, by means not shown, so that all operations occur in timed relation to the movement of the conveyer.

To effect the 2nd or preheating step in the process, the conveyer 12 moves the presized block 6 into a preheating oven 18 that can be heated by any suitable means, for example, infrared lamps 20. The preheating is not intended to saturate the entire block 6 with heat, but rather to heat the upper surface 22 of each block as it passes through the preheating oven 18 to prepare it to receive a bonding material.

The conveyer 12 successively carries the preheated blocks 6 to a spray booth 24 whose interior is connected with a ventilating system through a duct 26, where the 3rd step in the process is effected. A pipe 28 extends into the booth 24 and has a spray head 30 connected to one end thereof. The other end of the pipe 28 is connected to a source of liquid bonding material, which will be described in greater detail hereinafter. The spray head 30 applies a coating of bonding material 32, FIGS. 4 and 5, to the upper face 22 of the block as it is moved through the booth 24. The bonding material 32 penetrates the pores of the block 6 and aids in bonding the relatively lower viscosity matrix to the block, as will appear later. In view of the fact that the upper face 22 has been preheated, the solvent flashes off and the bonding coat 32 is polymerized in a short period of time. While a spray head 30 has been shown for applying the bonding coat to the block 6, it is to be understood that the coating may be applied by a brush or a roller, since only a coating sufficient to wet the surface of the block is necessary.

The conveyer 12 carries the block 6, with the polymerized coating of bonding material 32 thereon, to a position wherein the 4th step in the process is accomplished, i.e., a layer of matrix material 34 is deposited on the bonding coat 32.

Referring to FIG. 6, a relatively flat nozzle 36 is positioned to deposit a layer of the matrix material 34 on the bonding coat 32 as the block 6 is moved by the conveyer 12 past the nozzle 36. It is to be understood that the nozzle 36 has an elongated discharge opening that is approximately equal to the width of the upper face 22 of the block 6, so that the entire upper surface of the block is covered by a layer of the matrix material 34. A valve 38 connected with the nozzle 36 is operated in time relation to the movement of the conveyer 12 so that the valve 38 opens as a block 6 is moved into position beneath the nozzle 36, and is closed after the full length of the block has been coated. The matrix 34 is supplied to the nozzle 36 through a pipe 40, FIG. 4, connected with the outlet of a pump 42. The inlet of the pump 42 is connected by a pipe 44 with a tank 46 containing a supply of the matrix 34. The matrix 34 is of a relatively thick consistency and remains in a plastic state until it has been polymerized.

The next, or 5th, step in the process is to apply slab or facing elements 47 to the matrix 34 by pressure. Accordingly, a suction head 48, FIGS. 4 and 8, is positioned above the path of the block 6 and is transferred from a loading position, into the stated position, from an area in which slabs of brick or other facings are arranged in predetermined relation in a jig (not shown). The slabs 47 may be arranged in groups of six in any one of the patterns shown in FIGS. 11, 13, 15, or 17. Such slabs or facings 47 are picked up by the head 48 under suction applied thereto through a pipe 50. Directly below the suction head 48 is a conventional cylinder 52 having a piston rod assembly 54 to the upper end of which a U-shaped platform 56 is attached. Operating fluid is supplied to and exhausted from the cylinder 52 through pipes A and B, as needed. The legs 57 of the platform 56 are movable through suitable openings in the conveyer 12 so that they can engage the lower face of the block 6 and move it upwardly from the position shown in FIG. 8 to the position shown in FIG. 9. Such movement of the block 6 presses the matrix 34 against the slabs 47 to partially embed the slabs in the matrix. During this operation, a portion of the matrix 34 is forced into the space between the slabs 47, as indicated at 58 in FIG. 9 to simulate a mortar joint between the slabs. Suction to the head 48 is then relieved, as is also the pressure in the cylinder 52, so that the block 6 is lowered back onto the conveyer 12. The suction head 48 is then transferred to the loading position, previously referred to, to pick up the next group of pre-arranged slabs to be applied as facing to the next block 6.

The foregoing operations occur rapidly and in timed relation to the movement of the conveyer 12, so that the suction head 48 is always in proper position above a block 6 when operating fluid is admitted into the cylinder 52 through pipe B to raise the platform 56.

After the slab material 47 has been partially embedded in the matrix 34, and the platform 56 has been lowered, repositioning the block on the conveyer 12, the conveyer moves the block 6 to a position under a hopper 5 loaded with sand, to effect the 6th step in the process. The hopper 5 converges toward its lower end to form a narrow opening 60, FIG. 10, approximately equal to the width of the block 6. A gate 62 is pivoted at 64 on the hopper and is movable in timed relation to the movement of the conveyer (by means not shown) to open or close the opening 60. As a faced block 6 is moved into position below the opening 60, the gate 62 is opened and sand 66 is allowed to dribble onto the faced block. It is will be understood that the sand covers the slabs 47 and enters the space between the slabs and directly contacts the matrix at the simulated joints between the slabs.

The next or 7th step in the process is effected by the conveyer 12 moving the "sanded" block 6 into a curing oven 68 wherein the temperature is about 250° F. in order to effect a rapid curing or setting or polymerization of the matrix 34. After curing, the block 6 is carried by the conveyer 12 for discharge onto a support 70 from which it is removed and allowed to cool.

The 8th step takes place after cooling, when the block 6 is manually moved into a vertical position, or turned upside down so that the excess sand 66 falls from the block. The sand 66 does not adhere to the facing slabs 47, but does adhere to the exposed matrix between the slabs to present the appearance of a mortar joint. The sand 66 removed from the blocks 6 can be reclaimed and reused.

Thus, all of the steps depicted in FIG. 1 are accomplished, according to a preferred method.

FIG. 11 is an elevational view of a finished block 6, wherein slabs of brick or other suitable material 47 are arranged parallel in two groups of three slabs. The protruding matrix material 58, to which sand is adhered, simulates mortar joints so that the block presents the appearance of six bricks secured together by mortar. It will be noted that the upper and lowermost slabs 47 each have a longitudinal edge that coincides with the adjacent longitudinal edge of the block 6; and, further, that each of the slabs 47 has a transverse edge that coincides with the adjacent transverse edge of the block. The width of the joint between the slabs 47 corresponds to that conventionally used in laying brick, say, about ⅜"; wherefore, the finished block presents the appearance of six bricks held together by mortar. In order to attain the desired uniform spacing of the slabs 47 on all blocks so that uniformity is present in a wall built with the blocks, each block is presized to the vertical height X shown in FIG. 2. The dimension X is equal to the combined thickness of three bricks and two mortar joints. The brick arrangement if duplicated by hand-laid individual bricks, would be far more costly and require much more time than by building a wall using the faced block shown in FIG. 11.

FIG. 13 illustrates a modified design in which three slabs 47 of suitable size are arranged horizontally and three slabs 47a are arranged vertically on a block 6a. A group of blocks 6a is shown laid with staggered vertical mortar joints 72 and horizontal mortar joints 74 to provide a wall section. The pattern presented is non-conventional and would be expensive and time consuming if attempted to be duplicated by hand-laid, individual bricks.

FIG. 15 illustrates a third design arrangement of facing slabs, wherein all of the slabs 47b are arranged vertical and parallel. Here again, a hand-laid brick duplication would be costly and take a lot of time.

FIGS. 17 and 18 illustrate a fourth pattern design with facing elements 47c simulating a conventional brick wall pattern.

FIG. 19 diagrammatically illustrates a rectangular mold 76 comprising a bottom wall 78 and side walls 80. The mold 76 may be of any desired size and configuration and may be large enough to provide a panel for an entire room wall, or a decorative panel for the exterior of a building. In making a panel utilizing the mold 76, a sheet of woven fiber glass 82 is used as a backing, instead of a block. The fiber glass 82 is laid on the bottom wall 78. A layer of matrix 34a is then applied to the fiber glass sheet 82. The matrix 34a may be of any desired thickness, but preferably is not less than ⅜" thick. Slabs of facing material 47d are partially embedded in the matrix material 34a in any desired pattern. A layer of sand is then applied over the facing material and the spaces therebetween and the matrix 34a is then allowed to cure. After curing, the structure is removed from the mold 76 and excess sand is removed. As in the previous structures, the sand adhering to the matrix 34α will simulate a mortar joint, and if brick slabs are used, the resulting panel will simulate a large brick wall section.

An interesting and unusual effect is obtained in the ultimate block if slabs of different thickness are adhered to the block (or other backing member). In such case, it will be apparent that some of the slabs will protrude farther from the face of the block than the remaining slabs.

The bonding material 32 and 32a comprises essentially a polyester resin, a polymerizable monomer, a catalyst, and a solvent. The matrix 34 and 34α comprises essentially the same polyester resin and polymerizable monomer as in the bonding material, plus a catalyst and finely divided silica material.

As is well known, a polyester is formed from the condensation reaction of dicarboxylic acids with glycols to form esters. In preparing polyester suitable for use in the following specific examples, dicarboxylic acids, such as, malic anhydride, furmaric anhydride, phthalic anhydride, and isophthalic anhydride may be used singly, or in any combination, with glycols, such as ethylene glycol, dipropylene glycol, propylene glycol, diethylene glycol, bisphenol A adduct, neopental glycol or trimethyl pentanediol either singly or in combination to form the ester portion of the polyester resin. The ester portion is preferably 60% but can vary between 10% to 95% of the resin formulation.

The polymerizable monomer in the following examples may be any one of, or a combination of two or more of the following monomers: styrene diallyl phthalate, methyl methacrylate, vinyl toluene, triallyl cyanurate or chlorostyrene.

The catalyst used in the following examples may be one or more of a number of organic peroxides such as methyl ethyl ketone peroxide, benzoyl peroxide, di-tertiary butyl peroxide, cumene hydroperoxide, di-peroxesters, dialkyl peroxide, or aliphatic diacyl peroxide. These catalysts may be used with various promoters, such as, a cobalt soap of naphthenic acid, a cobalt soap of 2-ethylhexoic acid (octoic acid) and or various amines such as 2,2-dimethyl amine or N,N-dimethyl amine. Methyl-ethyl ketoneperoxide, for example, is used when a low temperature and slow polymerization is desired; and di-tertiary butyl peroxide, for example, is used when a high temperature and relatively rapid polymerization is desired. There are various types of ketones that maybe such as methyl ethyl ketone, acetone, methyl isobutyl ketone, methyl iso-amyl ketone, etc.

EXAMPLE I

A commercially available 4" x 8" x 16", 6" x 8" x 16", 8" x 8" x 16", or 12" x 8" x 12" concrete block, either standard or lightweight, is ground off at its top to produce the exact height desired. The block 6 is passed through the preheat oven 18 to raise its surface temperature to about 212° F. to 350° F., and preferably to about 225° F. The heated block 6 is then sprayed with a liquid bonding coat 32 having the following composition in percentage by weight:

Polyester resin—8% to 90%, and preferably 10%
Polymerizable monomer—7% to 90%, and preferably 8%
Solvent (for example, acetone)—5% to 99.1% of total formulation and, preferably 82%
Catalyst (for example, di-tertiary butyl peroxide)—.1% to 10%, and preferably 1% based on the combined weight of the resin and monomer The bonding coat or adhesive 32 penetrates into the block 6 to increase the adhesive properties of the matrix layer 34 to be applied to the block. After the acetone flashes off, the bonding material will polymerize in about five minutes.

A layer of matrix material 34, about ⅛" thick, is applied to the block 6 over the entire area of the bonding coat 32. The matrix is composed of the following materials in percentage by weight:

Polyester resin—8% to 90%, and preferably 12%
Polymerizable monomer—6% to 90%, and preferably 8%
Silica flour—0 to 95%, and preferably 80%
Colloidal silica—0% to 15%, and preferably 2% based on the weight of the resin
Catalyst (for example, di-tertiary butyl peroxide)—.1% to 10%, and preferably 1%, based on the weight of the resin Brick slabs or other material 47 are partially embedded in the matrix 34 in predetermined patterns, and sand 66 is applied to the entire area of the block 6 covering the slabs and the joints between the slabs. The "sanded" block is then heated in a curing oven 68 to a temperature of about 212° F. to 350° F. and preferably about 250° F. for a period of about 25 minutes. Such heating will polymerize the matrix 34 and permanently bond the facing material 47 to the block 6.

EXAMPLE II

The bonding material 32 may be applied to a block 6 at a lower temperature than that prescribed in Example I, that is, at a block temperature of about 15° F. to 225° F. In such instance, the bonding coat may have the following composition:

Polyester resin—8% to 90%, and preferably 10%
Polymerizable monomer—6% to 90%, and preferably 8%
Catalyst (for example, methyl ethyl ketone peroxide)—.1% to 10%, and preferably 1% based on the weight of the resin
Solvent (for example, acetone)—5% to 99.9% and preferably 81%, based on the weight of the total formulation After the acetone evaporates, polymerization is effected in about 5 minutes. In this example, the matrix 34 may have the following composition in percentage by weight:

Polyester resin—8% to 90%, and preferably 12%
Polymerizable monomer—6% to 90%, and preferably 8%
Silica flour—0 to 95%, and preferably 80%
Colloidal silica—0% to 15%, and preferably 2%
Catalyst (for example, methyl ethyl ketone peroxide)—1% to 10%, and preferably 1%; the percentage weight of the colloidal silica and methyl ethyl ketone peroxide being respectively based on the weight of the resin and monomer The matrix 34 is applied over the bonding coat 32 in a layer about ⅛" thick. Brick slabs or other facing 47 is partially embedded in the matrix and sand is applied over the entire top face of the block. The step of oven curing can be eliminated by allowing polymerizatin to take effect at room temperature, which will require about 24 hours.

The period of time required for polymerization depends on the temperature and catalyst concentration. The catalyst concentration can be as low as 0.25% or as high as 10%, based on the weight of the resin. The polymerization time can be as little as 30 seconds or as long as 24 hours. As a general rule, polymerization time is shortened with increased temperature or type of catalyst and percentage, or type of promoter and percentage.

One convenient way of forming the facing slabs is to take an ordinary brick and slice it (FIG. 3) with a ceramic saw to provide slabs 47 about 7⅝" by 2¼" by ⅜" thick. The size of the slabs may vary depending upon the final pattern desired on the block. The brick slab material may vary in thickness from ¼″ to 2″ with a preferred thickness of ⅜″.

In all forms of the invention, the bonding coat 32 is homogeneously united with the matrix 34 and they jointly provide a vapor barrier at the outer surface of the block, which renders it impervious to moisture. The adhesive material (i.e., the bonding coat 32 and matrix 34) is stronger than the block material and renders the block resistant to impact.

Faced blocks constructed in accordance with the present method have been subjected to freeze and thaw tests of 1000 cycles in a standard laboratory testing machine, the temperatures ranging from as low as —250° F. to —70° F. and to as high as 120° F., without any problem resulting from the repeated thermal expansion and contraction of the blocks, adhesive, and facing material. The coefficient of thermal expansion of the bonding coat and matrix is $1.31 \times 10^{-5}$ unit/unit/degree F. at 100° F.

It will be understood that various changes may be made in the examples given herein and in the methods described without departing from the principles of the invention.

We claim:

1. The method of making a faced building block, comprising: presizing the building block so that it will have at least one side of a predetermined width; preheating at least said one side of said block to a temperature of about 212° F. to about 350° F.; applying a bonding coat comprising a polyester resin to said one side of said block; effecting a cure of said polyester resin; applying a layer of matrix material comprising a polyester resin to the bonding coat; applying spaced apart slabs of facing material to the matrix with at least one edge of the slabs aligned with an edge of the block; partially embedding the spaced slabs in the matrix material; and effecting a cure of said matrix material.

2. The method defined in claim 1, including the step of curing the bonding material and matrix at room temperature.

3. The method defined in claim 1, wherein the bonding material comprises a polyester resin, a polymerizable monomer, a catalyst and a solvent.

4. The method defined in claim 1, wherein the matrix comprises a polyester resin, a polymerizable monomer, a catalyst and a filler material.

5. The method defined in claim 1, including the step of subjecting the block to a temperature of about 250° F. for a period of about 25 minutes to cure the matrix.

6. The method defined in claim 1, including the step of prearranging the pieces of facing material in a predetermined pattern.

7. The method as defined in claim 1, in which the bonding coat comprises:
polyester resin 8% to 90%;
polymerizable monomer 6% to 90%;
catalyst .1% to 10%, by weight of the resin; and
solvent 5% to 99.9%, by weight of the resin and monomer.

8. The method as defined in claim 1, in which the bonding coat comprises, by weight:
polyester resin about 10%;
polymerizable monomer about 8%;
solvent about 81%; and
catalyst about 1%.

9. The method as defined in claim 1, in which the layer of matrix comprises:
polyester resin 8% to 90%;
polymerizable monomer 6% to 90%;
silica flour 0% to 95%;
colloidal silica 0% to 15%, by weight of the resin; and
catalyst 1% to 10%, by weight of the resin.

10. The method as defined in claim 1, in which the layer of matrix comprises, by weight:
polyester resin about 12%;
polymerizable monomer about 8%;
silica flour about 8%;
colloidal silica about 2%, by weight of the resin; and
catalyst about 1%, by weight of the resin.

11. The method defined in claim 3, in which the bonding coat comprises, by weight:
polyester resin 8% to 90%;
polymerizable monomer 7% to 90%;
solvent 5% to 99.1% by weight of the resin and monomer; and
catalyst .1% to 10%, by weight of the resin.

12. The method as defined in claim 3, in which the bonding coat comprises, by weight:
polyester resin about 10%;
polymerizable monomer about 8%;
solvent about 82%; and
catalyst about 1% by weight of the resin and monomer.

13. The method defined in claim 4, wherein the filler material is finely divided silica.

14. The method defined in claim 6, in which the pieces of facing material are arranged in a pattern such that they are spaced apart to simulate a mortar joint, and including the step of applying sand to the facing material and to the matrix material exposed at said simulated mortar joints.

15. The method as defined in claim 4, in which the matrix comprises:
polyester resin 8% to 90%;
polymerizable monomer 6% to 90%;
silica flour 0% to 95%;
colloidal silicon 0% to 15%, by weight of the resin and monomer; and
catalyst about .1 to 10% by weight of the resin and monomer.

16. The method as defined in claim 4, in which the matrix comprises, by weight:
polyester resin about 12%;
polymerizable monomer about 8%;
silica flour about 80%;
colloidal silica about 2%, by weight of the resin and monomer; and
catalyst about 1%, by weight of the resin and monomer.

References Cited

UNITED STATES PATENTS

| Number | Date | Name | Class |
|---|---|---|---|
| 3,155,529 | 11/1964 | Paturzo | 52—315 |
| 3,521,418 | 7/1970 | Bartoloni | 52—389 |
| 2,229,742 | 1/1941 | Kauffman | 52—390 |
| 3,423,224 | 1/1969 | Schmidt | 117—72 |
| 3,552,988 | 1/1971 | Boiardi | 117—16 |
| 2,953,469 | 9/1960 | Fox | 117—9 |
| 3,097,080 | 7/1963 | Weir | 117—9 |
| 3,552,987 | 1/1971 | Smith | 117—33 |
| 3,391,507 | 7/1968 | Downing | 52—314 |
| 3,496,694 | 2/1970 | Hicks et al. | 52—314 |
| 3,524,790 | 8/1970 | Mason | 52—314 |

FOREIGN PATENTS

| Number | Date | Country | Class |
|---|---|---|---|
| 222,786 | 10/1956 | Australia | 117—9 |
| 224,046 | 2/1958 | Australia | 117—25 |

WILLIAM D. MARTIN, Primary Examiner

W. R. TRENOR, Assistant Examiner

U.S. Cl. X.R.

52—309, 314; 117—25, 29, 33, 47 H, 72, 104 R, 123 D, 161 K; 156—298, 303.1; 161—38, 41, 69, 162, 206; 260—37 R, 40 R, 41 A